United States Patent
Barron

(10) Patent No.: US 7,171,857 B2
(45) Date of Patent: Feb. 6, 2007

(54) PRESSURE TRANSDUCER

(75) Inventor: Leo Barron, Franklin, MA (US)

(73) Assignee: Dynisco Instruments, Franklin, MA (US)

( * ) Notice: Subject to any disclaimer, the term of this patent is extended or adjusted under 35 U.S.C. 154(b) by 128 days.

(21) Appl. No.: 11/024,573

(22) Filed: Dec. 29, 2004

(65) Prior Publication Data

US 2005/0150302 A1    Jul. 14, 2005

Related U.S. Application Data

(62) Division of application No. 10/464,967, filed on Jun. 19, 2003, now Pat. No. 6,923,068.

(51) Int. Cl.
*G01L 9/02* (2006.01)

(52) U.S. Cl. .............. 73/719; 73/725; 73/756; 257/419

(58) Field of Classification Search .......... 73/719, 73/725, 756; 257/414, 419
See application file for complete search history.

(56) References Cited

U.S. PATENT DOCUMENTS

| 4,016,437 A | 4/1977 | Calderara et al. |
| 4,056,009 A | 11/1977 | Sonderegger et al. |
| 4,059,999 A | 11/1977 | Engeler et al. |
| 4,061,035 A | 12/1977 | Witzke et al. |
| 4,127,840 A | 11/1978 | House |
| 4,148,530 A | 4/1979 | Calderara |
| 4,314,481 A | 2/1982 | Wolfer et al. |
| 4,341,974 A | 7/1982 | Calderara |
| 4,379,405 A | 4/1983 | Engeler et al. |
| 4,503,351 A | 3/1985 | Sonderegger et al. |
| 4,519,254 A | 5/1985 | Sonderegger et al. |
| 4,559,821 A | 12/1985 | Engeler et al. |
| 4,570,097 A | 2/1986 | Shukla et al. |
| 4,645,965 A | 2/1987 | Paganelli |
| 4,679,438 A | 7/1987 | Wareham |

(Continued)

FOREIGN PATENT DOCUMENTS

EP    0336437 A2    10/1989

(Continued)

OTHER PUBLICATIONS

Search Report and Written Opinion from International Application No. PCT/US2004/016145, mailed Jan. 28, 2005.

*Primary Examiner*—Edward Lefkowitz
*Assistant Examiner*—Andre Allen
(74) *Attorney, Agent, or Firm*—Wolf, Greenfield & Sacks, P.C.

(57) ABSTRACT

One aspect is a pressure transducer package comprising a housing, a diaphragm, a support disposed in the housing and a sensing element disposed in the housing between the diaphragm and the support so that the pressure from the environment acts on the diaphragm to compress the sensing element. The sensing element comprises at least one substrate having a coefficient of thermal expansion greater than 4 ppm/k. In another aspect, the sensing element comprises at least one substrate formed of a first material and an epitaxial layer of a second material having a lower coefficient of thermal expansion. In a further aspect, the support abuts the housing at a spherically-shaped interface to compensate for misalignment between the support and the sensing element to ensure that the sensing element is evenly loaded.

16 Claims, 4 Drawing Sheets

U.S. PATENT DOCUMENTS

| | | |
|---|---|---|
| 4,680,972 A | 7/1987 | Wareham |
| 4,683,757 A | 8/1987 | Adams et al. |
| 4,702,113 A | 10/1987 | Wareham |
| 4,712,430 A | 12/1987 | Wareham |
| 4,735,091 A | 4/1988 | Engeler et al. |
| 4,800,760 A | 1/1989 | Wolfer et al. |
| 4,819,487 A | 4/1989 | Wareham |
| 4,829,827 A | 5/1989 | Wareham |
| 4,843,887 A | 7/1989 | Engeler et al. |
| 4,858,471 A | 8/1989 | Wareham |
| 4,974,454 A | 12/1990 | Wolfer et al. |
| 4,982,608 A | 1/1991 | Märki et al. |
| 4,986,129 A | 1/1991 | Ruckenbauer et al. |
| 4,996,878 A | 3/1991 | Kübler |
| 5,024,107 A | 6/1991 | Bethe |
| 5,088,329 A | 2/1992 | Sahagen |
| 5,095,741 A | 3/1992 | Bartig et al. |
| 5,138,885 A | 8/1992 | Okauchi et al. |
| 5,142,914 A | 9/1992 | Kusakabe et al. |
| 5,168,192 A | 12/1992 | Kosugi et al. |
| 5,181,417 A * | 1/1993 | Nishida et al. ............... 73/115 |
| 5,186,055 A | 2/1993 | Kovacich et al. |
| 5,199,303 A | 4/1993 | Benedikt et al. |
| 5,209,119 A | 5/1993 | Polla et al. |
| 5,249,468 A | 10/1993 | Benedikt et al. |
| RE34,441 E | 11/1993 | Ruckenbauer et al. |
| 5,347,841 A | 9/1994 | Enzinna |
| 5,360,331 A | 11/1994 | Wareham |
| 5,440,932 A | 8/1995 | Wareham |
| 5,461,922 A | 10/1995 | Koen |
| 5,503,023 A | 4/1996 | Benedikt et al. |
| 5,515,732 A | 5/1996 | Willcox et al. |
| 5,583,295 A | 12/1996 | Nagase et al. |
| 5,602,339 A | 2/1997 | Wareham |
| 5,670,722 A | 9/1997 | Moser et al. |
| 5,703,296 A | 12/1997 | Little et al. |
| 5,709,337 A | 1/1998 | Moser et al. |
| 5,824,910 A * | 10/1998 | Last et al. .................... 73/715 |
| 5,852,320 A * | 12/1998 | Ichihashi .................... 257/419 |
| 6,066,882 A * | 5/2000 | Kato .......................... 257/414 |
| 6,092,426 A | 7/2000 | Vollenweider et al. |
| 6,229,190 B1 * | 5/2001 | Bryzek et al. .............. 257/419 |
| 6,487,898 B1 | 12/2002 | Haefner et al. |
| 6,508,129 B1 | 1/2003 | Sittler |
| 6,550,337 B1 * | 4/2003 | Wagner et al. ................. 73/715 |
| 2004/0118216 A1 | 6/2004 | Reinhart et al. |

FOREIGN PATENT DOCUMENTS

| | | |
|---|---|---|
| EP | 0352773 A2 | 1/1990 |
| EP | 0 855 585 A2 | 7/1998 |
| EP | 0855585 A2 | 7/1998 |
| EP | 1 662 242 A1 | 5/2006 |

* cited by examiner

PRESSURE TRANSDUCER

RELATED APPLICATIONS

This application is a divisional of U.S. patent application Ser. No. 10/464,967, filed on Jun. 19, 2003 now U.S. Pat. No. 6,923,068, the entire contents of which are hereby incorporated by reference.

FIELD OF THE INVENTION

This invention relates generally to the field of pressure transducers.

BACKGROUND OF INVENTION

Pressure transducers are used to measure pressure in environments of interest, such as media-filled chambers used in the extrusion of plastics, injection molding processes, down-hole sensing in oil and gas exploration, combustion engines, and various other applications.

Pressure transducers conventionally comprise a diaphragm at one end that can be brought into contact with process media in the environment of interest and displaced by the pressure of the process media. For example, in the case of a pipe, the pressure transducer may be inserted (or screwed) into an opening in the wall of the pipe, such that the diaphragm is in contact with the media (e.g., molten plastic, fluid, etc.) inside the pipe.

The diaphragm of the pressure transducer is mechanically coupled to a sensor element, which is disposed inside a housing. The sensor element measures the pressure of the process media in the environment of interest, based on a physical parameter such as compression, displacement or deformation of the sensor element, with the media pressure being transferred to the sensor element from the diaphragm either directly or through a mechanical coupling. The sensor element may comprise, for example, piezoelectric or piezoresistive crystals configured to provide an electrical signal indicative of the sensed pressure.

In a conventional pressure transducer, the sensor element is held in place (against deflections of the diaphragm) by a support (also referred to as a pedestal), which in turn abuts, and is held in place by, an inner surface of the transducer housing.

The sensor element of a pressure transducer is typically sensitive to small changes in the physical parameter that it uses to measure pressure. For example, where pressure is measured based on the compression of the sensor element, a small compressive load on the sensor element may be significant to the pressure measurement. Accordingly, imperfect construction or misalignment of the components of the pressure transducer during manufacture or assembly can lead to inaccurate pressure readings if an uneven or undesired load is exerted on the sensor element as a result.

Another consideration in pressure transducer design, particularly for high-temperature applications, relates to thermal expansion of the pressure transducer components. The housing of the pressure transducer is typically constructed from stainless steel, which has a relatively high coefficient of thermal expansion. The sensor element and the support, however, are often made from other materials, such as ceramics, that have lower coefficients of thermal expansion. This imbalance in thermal expansion properties can lead to uneven expansion of the internal and external components of the pressure transducer, especially at higher temperatures, which, if not compensated for, can have an undesired impact on the loading of the sensor element and cause inaccurate measurement of the pressure in the environment of interest.

SUMMARY OF INVENTION

One illustrative embodiment is directed to a pressure transducer package for measuring the pressure in an environment. The pressure transducer package comprises a housing; a diaphragm supported by the housing; a support disposed in the housing; and a sensing element disposed in the housing between the diaphragm and the support so that the pressure from the environment acts on the diaphragm to compress the sensing element. The sensing element comprises at least one substrate; and at least one piezoresistor formed on the at least one substrate; wherein the at least one substrate is formed of a material having a coefficient of thermal expansion greater than 4 ppm/k at 600 degrees kelvin.

Another illustrative embodiment is directed to a pressure transducer package comprising a housing; a diaphragm supported by the housing; a support disposed in the housing; and a sensing element disposed in the housing between the diaphragm and the support so that the pressure from the environment acts on the diaphragm to compress the sensing element. The sensing element comprises at least one substrate formed of a first material having a first coefficient of thermal expansion; an epitaxial layer of a second material formed on the at least one substrate, the second material having a second coefficient of thermal expansion that is less than the first coefficient of thermal expansion; and a plurality of piezoresistors formed in the epitaxial layer.

A further illustrative embodiment is directed to a pressure transducer package comprising a diaphragm capable of deflecting in response to pressure detected in an environment; a sensing element that is mechanically coupled to the diaphragm to detect deflections in the diaphragm; a support that supports the sensing element and resists movement of the sensing element in response to deflections in the diaphragm; and a housing that receives the sensing element and the support and that has an opening that is at least partially covered by the diaphragm, wherein the support abuts the housing at a spherically-shaped interface.

Another illustrative embodiment is directed to a pressure transducer package comprising a diaphragm capable of deflecting in response to pressure detected in an environment; a sensing element that is mechanically coupled to the diaphragm to detect deflections in the diaphragm; a support that supports the sensing element and resists movement of the sensing element in response to deflections in the diaphragm; and means for compensating for misalignment between the support and the sensing element to ensure that the sensing element is evenly loaded.

A further illustrative embodiment is directed to a pressure transducer package comprising a housing; a diaphragm, supported by the housing, capable of deflecting in response to pressure detected in an environment; a sensing element that is disposed in the housing and mechanically coupled to the diaphragm to detect deflections in the diaphragm; and a support that supports the sensing element and resists movement of the sensing element in response to deflections in the diaphragm, the support being disposed within the housing without being secured thereto and abutting the housing at a spherically-shaped interface.

BRIEF DESCRIPTION OF DRAWINGS

FIG. 2 is a cross sectional view taken along line 2—2 in FIG. 1a.

FIG. 3 is a cross sectional view taken along line 3—3 in FIG. 1a.

FIG. 4 is an exploded perspective view of the illustrative embodiment of the pressure transducer shown in FIG. 1a.

DETAILED DESCRIPTION

Figure 1A:
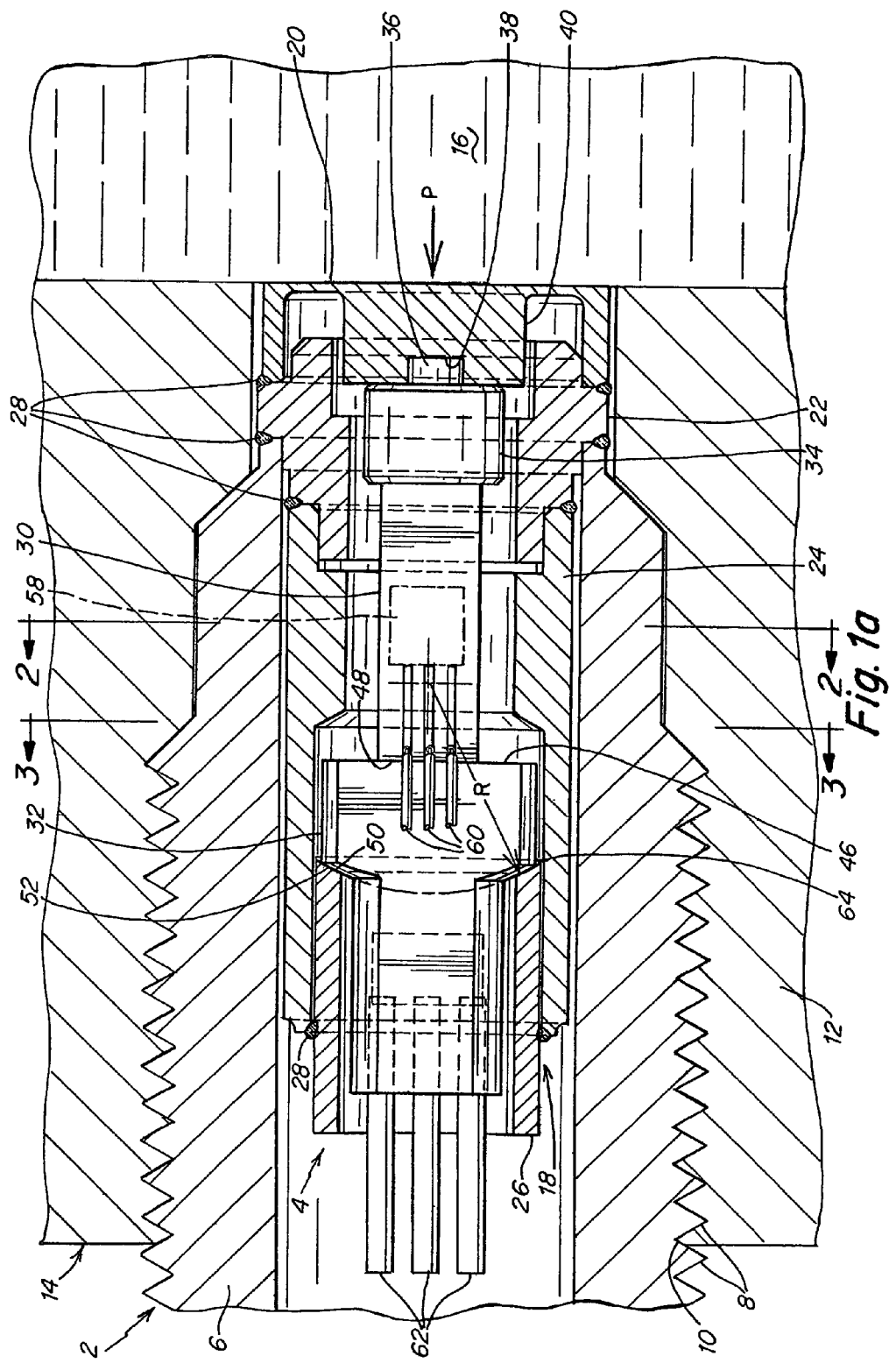
FIG. 1a is a side cutaway view of a pressure transducer, in accordance with one illustrative embodiment of the invention, screwed into the wall of a pipe.

One aspect of the invention relates to techniques for minimizing or avoiding uneven or undesired loads on the sensor element as a result of imperfect construction or misalignment of the components of the pressure transducer during manufacture or assembly.

In one embodiment of the invention, the interface between the support (pedestal) supporting the sensor element and the inner surface of the transducer housing that abuts the support is configured as an area of a spherical surface (referred to hereinafter as a spherically-shaped interface area or surface). The spherically-shaped interface introduces rotational degrees of freedom for the pedestal (in two orthogonal directions) that permit the pedestal to accommodate misalignment of the sensor element or other components of the transducer (due to imperfect construction, uneven welding, etc.) without introducing uneven loading on the sensor element.

In the embodiments shown in the figures, the spherically-shaped interface is an annular section of a spherical surface. However, this aspect of the invention is not limited in this regard, as the spherically-shaped interface may be a portion of an annular section that is less than the full annulus, or any other portion of a spherical surface that comprises an "area" in the geometric sense; i.e., a section that is not simply a point or a width-less arc, but rather is curved in two orthogonal directions.

Another aspect of the invention relates to techniques for handling dissimilar rates of thermal expansion of various components of the pressure transducer. As noted above, the housing of the pressure transducer may be constructed from a material (e.g., stainless steel) that has a relatively high coefficient of thermal expansion, while the sensor element and the support may be constructed from other materials (e.g., ceramics) that have lower coefficients of thermal expansion. At elevated operating temperatures (one embodiment of the invention is configured to operate in conjunction with process media at between 300 and 400 degrees Celcius, although the invention is not limited in this regard), the pressure sensor housing may expand relative to the sensor element. If not compensated for, this relative expansion could impact the "calibrated" compressive loading of the sensor element, and might resulting in inaccurate measurements of the pressure in the environment of interest.

In this respect, during the manufacture and assembly of conventional pressure transducers, the sensor element is placed under a pre-load, and measurements of the pressure in the environment of interest are determined with knowledge of the calibrated pre-load. If one does not compensate for the disparity between the coefficients of thermal expansion of the housing and the components within the housing, the compressive pre-load on the sensor element may fall below the calibrated amount, leading to inaccurate readings of the pressure in the environment of interest. Moreover, if the compressive pre-load falls too far, the internal components of the pressure transducer may not be held securely.

In one embodiment of the invention, the aforementioned thermal expansion disparity is addressed, at least in part, by employing a sensor element formed of one or more materials having a coefficient of thermal expansion higher than that of silicon—the material used to form the sensor element substrate in many conventional pressure transducers. As a result, the sensor element substrate(s) has a coefficient of thermal expansion closer to that of the material(s) from which the pressure transducer housing is constructed.

In the description below, the two aforementioned aspects of the invention relating to (1) the spherically-shaped interface and (2) the sensor element substrate(s) with a higher coefficient of thermal expansion are used together in a pressure transducer in accordance with one embodiment of the invention. However, the present invention is not limited in this respect, as each of these aspects of the invention can be used separately.

A pressure transducer 2 in accordance with one embodiment of the present invention that incorporates both of the above-discussed aspects of the present invention is illustrated in FIG. 1a. In FIG. 1a, the pressure transducer 2 comprises a pressure-sensing package 4, a probe 6 (to which the package 4 is attached) and electronics (not shown) for processing electrical signals generated by the package 4.

The probe 6 of pressure transducer 2 is screwed with threads 8 into opening 10 of wall 12 of a pipe 14 to measure the pressure of a process media 16.

The package 4 comprises a housing 18 and internal components described below. Housing 18 of package 4 in turn comprises diaphragm 20, ring (or collar) 22, sleeve 24, and ferrule 26, which are welded together at appropriate points. Some exemplary welds are depicted with reference numeral 28, but the invention is not limited in this regard, as welds may be formed in numerous other locations. Similarly, the invention is not limited to any particular housing construction; the use of a ferrule, sleeve, ring and diaphragm in the particular configuration shown is exemplary only. In other embodiments, the housing 18 may be cast in one piece, or may comprise other pieces connected (e.g., welded) together in other ways.

The internal components disposed within the housing 18 include sensor element 30, pedestal 32 and a compensator 34. The compensator 34 serves, in a conventional manner, to compensate for differences in the coefficients of thermal expansion of the housing 18 and the components within the housing 18 (e.g., the sensor element 30). For example, in one embodiment, the components of the housing 18 are formed of 17-4 series stainless steel, and the compensator 34 is formed of 300 series stainless steel, which has a higher coefficient of thermal expansion than 17-4 series stainless steel. In another embodiment, sleeve 24 and/or other components of housing 18 are fabricated from an alloy with a coefficient of thermal expansion lower than 17-4 series stainless steel, such as Incoloy 909, CTX-909, Pyromet 909, Incoloy 903, CTX-3 or Ascoloy. The use of such alloys for one or more components of housing 18, with relatively low coefficients of thermal expansion, is helpful in balancing the expansion of the housing 18 versus the expansion of the internal components. Of course, the present invention is not limited to the use of these or any particular materials.

The compensator 34 may be used in embodiments of the present invention that employ conventional sensor elements, and may also be used with embodiments that employ sensor elements whose substrates have a higher coefficient of thermal expansion in accordance with one embodiment of the present invention (described in more detail below). In this respect, even when a sensor element 30 is employed having a substrate with a relatively high (for sensor element substrates) coefficient of thermal expansion, the substrate of the sensor element 30 may still have a coefficient of thermal expansion less than that of the housing 18. Thus, a compensator 34 may (optionally) be placed directly abutting diaphragm 20, or anywhere else within the mechanically coupled series of internal components within package 4 to help balance the thermal expansion properties of the internal components relative to those of the housing 18, such that an appropriate pre-load is retained on the sensor element 30 within the temperature range in which the package 4 is used.

In the embodiment shown in FIG. 1*a*, the mechanically coupled series of internal components comprises (from right to left) diaphragm 20, compensator 34, sensor element 30, and pedestal 32, with pedestal 32 abutting ferrule 26 of the housing 18. In an alternative embodiment, pedestal 32 may abut a portion integral to the housing 18 rather than a separable component such as ferrule 26.

Compensator 34, sensor element 30 and pedestal 32 are said to be located "between" the diaphragm 20 and the ferrule 26, even though no single one of these components is sandwiched directly between the diaphragm 20 and the ferrule 26, abutting both of them directly. Accordingly, the phrase "between components A and B" as used herein connotes a position within a longitudinal series of components that includes component A at one end and component B at the other end (for example, the diaphragm 20 and the ferrule 26). A component may therefore be positioned "between" two other components A and B without necessarily being in direct physical contact with either or both of components A and B.

In one embodiment of the present invention, the transducer 2 is capable of measuring not only the pressure in the environment of interest, but also the temperature. For that embodiment, the materials used for compensator 34 and diaphragm 20 are selected to be thermally conductive, so that the temperature of the environment of interest is communicated to the sensor element 30. However, it should be appreciated that the aspects of the present invention described herein are not limited to use with a transducer that measures temperature, and that when the transducer does not measure temperature, the materials used for the diaphragm 20 and the (optional) compensator 34 need not be thermally conductive.

While employed in the embodiment shown in the figures, the invention is not limited to the use of a compensator.

In the embodiment shown, compensator 34 includes a projection 36 which is received by a female portion 38 in a boss 40 in the diaphragm 20. The projection 36 and female portion 38 facilitate the guiding of the compensator 34 into engagement with the diaphragm 20 during assembly. The invention is not limited in this regard, as the particular construction shown is merely illustrative.

In one embodiment, compensator 34 is not secured to diaphragm 20. Alternatively, compensator 34 may be secured to diaphragm 20 by welding, adhesive, press fit between projection 36 of compensator 34 and female portion 38 of diaphragm 20, or by any other suitable method. The invention is not limited in this respect.

The compensator 34, when used, is mechanically coupled to the diaphragm 20 such that the media pressure exerted on diaphragm 20 is transmitted through compensator 34 to sensor element 30. The coupling between the sensor element 30 and the compensator 34 can be achieved in any suitable manner (e.g., by the pieces simply being sandwiched together), as the present invention is not limited in this respect.

The machining, assembly and/or welding of the various components of housing 18, as well as compensator 34, diaphragm 20 or sensor element 30, may be imperfect, leading to asymmetries and/or misalignments within package 4. An example of a misalignment of the sensor element 30 is depicted schematically in FIG. 1*b*, wherein the longitudinal axis 44 of the sensor element 30 is angled relative to the longitudinal axis 42 of package 4. If not compensated for, such misalignment can cause difficulties in assembly and/or uneven loading of the sensor element 30, which in turn can result in inaccurate pressure measurements.

Figure 1B:
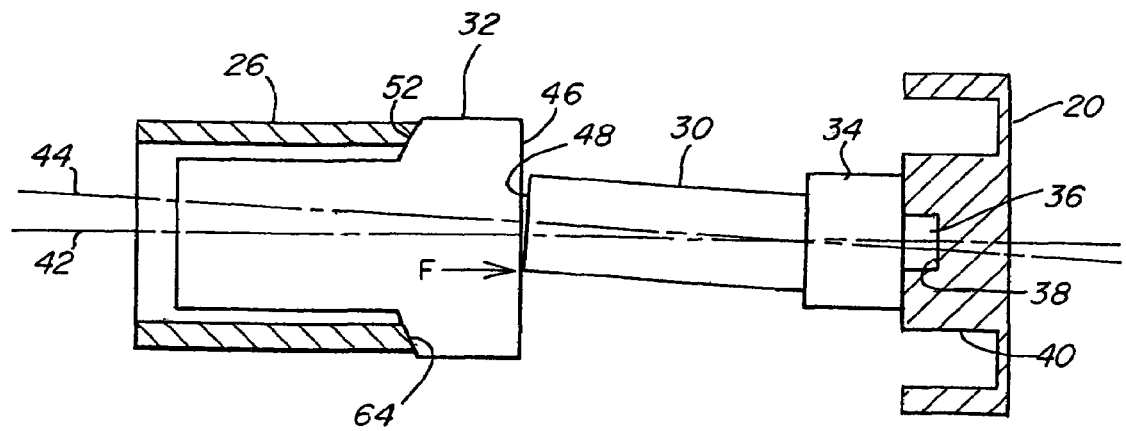
FIG. 1b is a schematic illustration showing a type of misalignment that can occur between the components in a pressure transducer.

If sensor element 30 is misaligned relative to longitudinal axis 42 of package 4, and pedestal 32 is not able to accommodate that misalignment (e.g., by rotating relative to housing 18), so that its front face 46 is in flush contact with back face 48 of sensor element 30, then uneven loading of sensor element 30 may result. For example, as shown in FIG. 1*b*, the pedestal 32 may exert a force on one region of sensor element 30, rather than distributing that force evenly over back face 48 of sensor element 30. As noted above, such uneven loading can be problematic, and can result in inaccurate pressure measurements.

Figure 4:
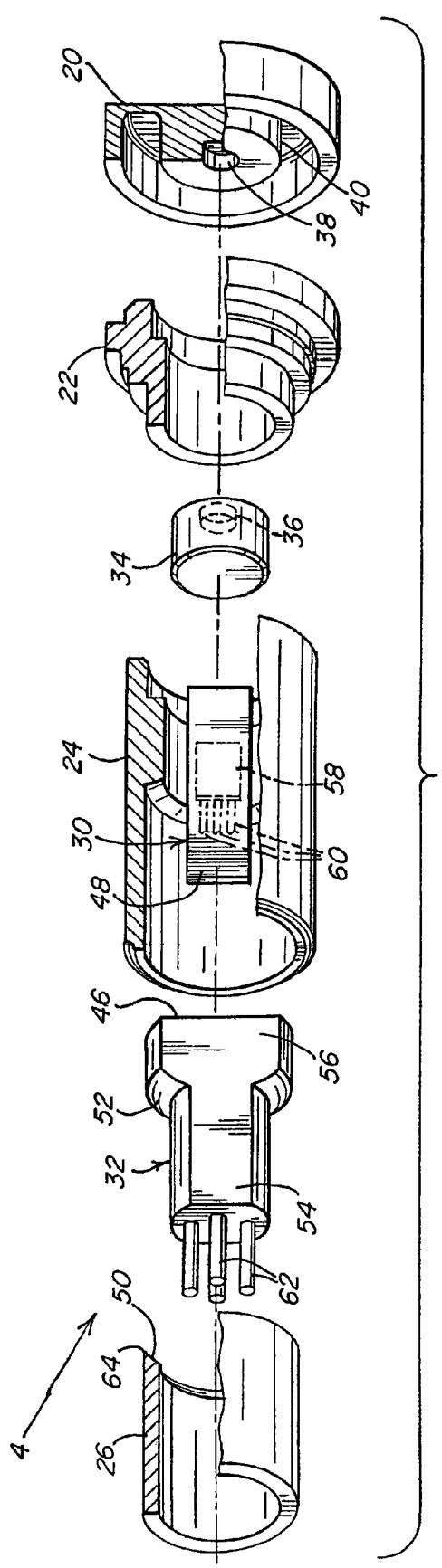

In one aspect of the invention discussed above, a spherically-shaped interface is provided between the housing 18 and one or more of the components disposed therein. This can be accomplished in any of numerous ways, as this aspect of the present invention is not limited to any particular implementation technique. In the embodiment of the invention shown in the figures (e.g., FIGS. 1*a*, 1*c*, 3 and 4), pedestal 32 can accommodate misalignment (e.g., of compensator 34 or sensor element 30) by rotating along a spherically-shaped interface. Ferrule 26 comprises a spherically concave annular seat 50. A complementary, spherically convex shoulder portion 52 (which comprises a portion of an annulus, as illustrated, for example, in FIG. 4) is provided on pedestal 32. Because the pedestal 32 is not fixed to the housing 18, it is free to rotate with respect to the housing 18 to accommodate misalignment of the sensor element 30 or other components disposed within the housing 18.

Figure 1C:
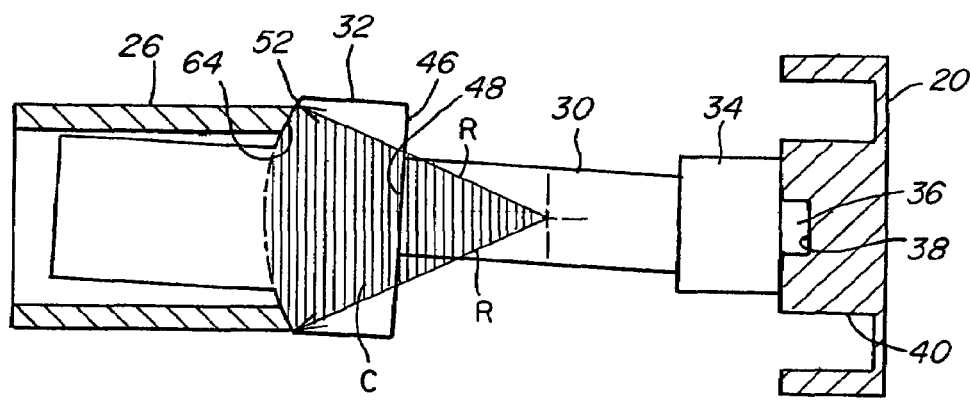
FIG. 1c is a schematic illustration showing a pressure transducer in accordance with one illustrative embodiment of the present invention, with the pedestal rotated to compensate for the type of misalignment shown in FIG. 1b.
Figure 2:
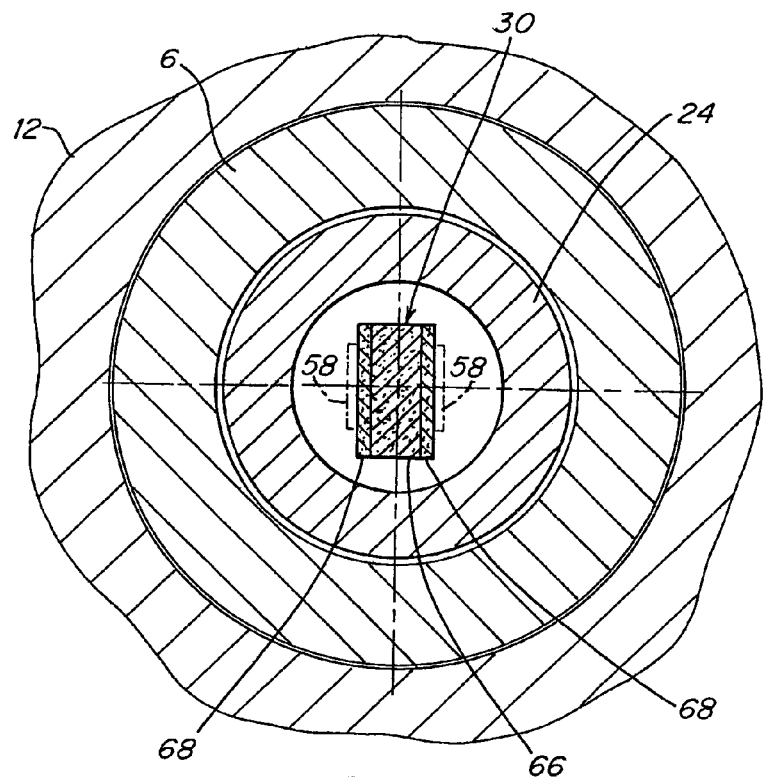
Figure 3:
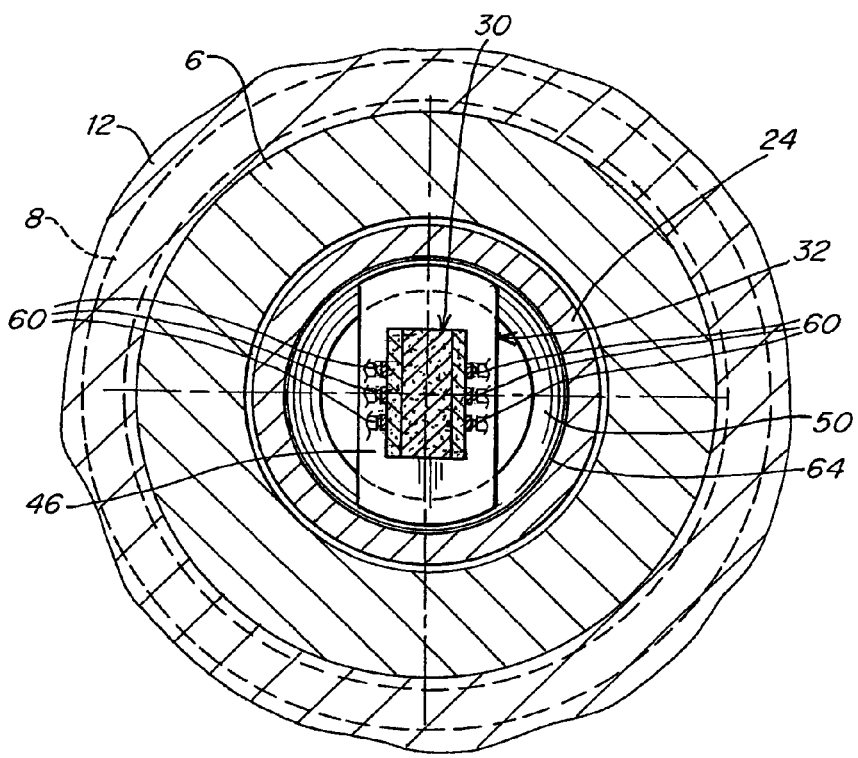

FIG. 1*c* schematically depicts the sensor element 30 misaligned as in FIG. 1*b*, but with pedestal 32 rotated to accommodate the misalignment. In the construction of FIG. 1*c*, the front face 46 of pedestal 32 and the back face 48 of sensor element 30 are flush, such that the loading of the sensor element 30 is evenly distributed.

In the embodiments shown in the figures, the lateral sides of pedestal 32 are configured as flat surfaces to facilitate the screening thereon of conductive metallization traces 60, electrically connected to piezoresistors 58 (discussed in more detail below) on sensor element 30. The invention is not limited in this regard, however, and the lateral sides of pedestal 32 may have any suitable shape. Conductive metallization traces 60 in turn are electrically connected to tubular sockets 62 which protrude from the back portion 54 of pedestal 32. Again, the invention is not limited in this regard, and any suitable configuration may be employed to provide appropriate electrical output(s) from the package.

Although the spherically-shaped interface between pedestal 32 and ferrule 26 shown in the figures is an annular section of a spherical surface, rotation of pedestal 32 relative to housing 18 can be accomplished in other ways too. For example, ferrule 26, which is a hollow cylinder in the embodiment shown in the figures, maybe replaced with a solid cylinder having a spherically concave surface at one face, forming a "socket" of a ball-and-socket type joint. In that case, the back portion 54 of pedestal 32 may be removed, and the remaining front portion 56 of pedestal 28 may have comprise a convex surface facing ferrule 26, forming a "ball" of a ball-and-socket type joint. In such a case, a suitable alternative to tubular sockets 62 may be employed to provide appropriate electrical output(s) from the package.

Other variations and configurations of the spherically-shaped interface may also be used. For example, the spherically-shaped interface may be placed between other components, and need not necessarily be located between the pedestal 32 and the ferrule 26. Additional degrees of freedom for accommodating misalignment may be provided in various ways, depending on the particular construction of the package 4. The invention is not limited to the exemplary embodiment shown in the figures.

A relatively large radius of curvature of the spherically-shaped interface (e.g., the interface between spherically concave annular seat 50 on ferrule 26 and spherically convex shoulder portion 52 on pedestal 32 as shown in the illustrative embodiment of the figures) is desirable because it is believed to provide a more stable interface between the respective components. As shown in FIG. 1c, in one embodiment the radius of curvature R of the annular seat 50 and the shoulder portion 52 extends into the sensor element 30. In a further embodiment, the back face 48 of the sensor element 30 is included within the cone C (shown in FIG. 1c) formed by the outer rim 64 of the spherically concave annular seat 50 on ferrule 26 and the center of curvature of the spherically-shaped interface. The invention is not limited in this regard, however, as other radii of curvature are also contemplated.

The construction of the package 4 has an impact on the radius of curvature of the spherically-shaped interface. As shown in FIG. 1a, the clearance provided between the pedestal 32 and the ferrule 26 may be relatively small in some packages. The displacement of the pedestal 32 in a direction perpendicular to the longitudinal axis 42 of the package 4 should not exceed this clearance. For small angles of rotation of pedestal 32 with respect to longitudinal axis 42, this displacement can be approximated as the product of the radius of curvature of the spherically-shaped interface, and the angle of rotation expressed in radians. Thus, in one embodiment, the radius of curvature should not exceed the clearance divided by the angle of rotation desired to be accommodated, expressed in radians.

In one embodiment, the pedestal 32 is able to rotate to accommodate up to approximately 2 degrees of misalignment with respect to the longitudinal axis 42 of the package 4. Given a particular clearance, dictated by the physical parameters of the package 4, an appropriate radius of curvature can readily be approximated.

In other embodiments, the amount of misalignment considered desirable to accommodate may vary, and the clearance provided between the pedestal 32 and the inner surface of the ferrule 26 may vary as well. As one of ordinary skill in the art will readily understand, these parameters may be varied to achieve desired results.

In accordance with one embodiment, during assembly of the package 4, the pedestal 32 and the sensor element 30 are joined into a sub-assembly with glass or another appropriate adhesive, before being inserted into housing 18. The invention is not limited in this regard, however, and the pedestal 32 and the sensor element 30 may be joined in any other suitable fashion, or need not be joined at all. Once the pedestal 32 and the sensor element 30 are inserted into the housing 18, the ferrule 26 may be inserted behind them, a pre-load may be applied, and the ferrule 26 may be welded into place to maintain the pre-load, in accordance with one embodiment. The invention is not limited in this regard, and can be manufactured and assembled in any suitable fashion.

In another aspect of the invention introduced above, the sensor element 30 is constructed from one or more materials having a relatively high coefficient of thermal expansion. At elevated temperatures, a sensor element 30 made of such material(s) expands to more closely match the thermal expansion of the housing 18, which may be constructed from stainless steel such as series 17-4, another metal alloy, or any other suitable material. As noted above, such a sensor element may be used in conjunction with a compensator (such as compensator 34) having a high coefficient of thermal expansion, or alternatively may be used without a compensator. This choice may depend on the balance of thermal expansion properties of various components, and may be determined empirically.

In one embodiment, the material used for the sensor element 30 has lattice spacing that is appropriate to facilitate surface growth of single-crystal piezoelectric or piezoresistive crystals 58, which are sensitive to small strains.

Figure 5:
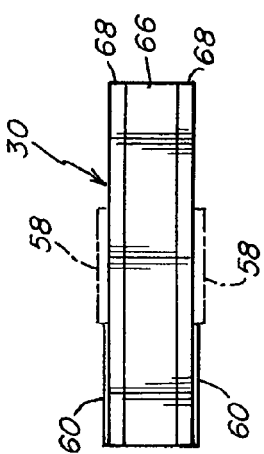
FIG. 5 is a top plan view of a sensor element in accordance with one illustrative embodiment of the present invention.

In one embodiment, epitaxial piezoresistors 58 are grown, from silicon or gallium nitride, on sapphire substrates 68 (shown in FIG. 5). This growth process is known as an "epitaxial" process of growing one crystal (e.g., silicon) on top of another (e.g., sapphire) while maintaining the crystalline structure of each. Other materials can also be used for the subtrates 68 and the epitaxial layers. The piezoresistors are arranged in a Wheatstone bridge configuration.

In one embodiment, sapphire is used for sensor element 30 because sapphire exhibits strength when subjected to a compressive loading, and has a relatively high coefficient of thermal expansion (in the range of approximately 6.6 to 7.7 ppm/k). The units "ppm/k" denote millionths of inches of expansion per inch of overall length, per degree Kelvin (or Celcius) of temperature change.

FIG. 5 shows a top plan view of the sensor element 30, which comprises a core of alumina 66 sandwiched between two substrates 68. On each substrate, piezoresistors 58 are grown (e.g., in an epitaxial layer) in an appropriate configuration. Because alumina and sapphire have substantially the same coefficients of thermal expansion, the match is appropriate for high-temperature applications. Conductive metallization traces 60 extend toward back face 48 of sensor element 30 for connection to conductive metallization traces 60 on pedestal 32 (see FIG. 1a).

The alumina core 66 used between two sapphire substrates 68 provides support for the substrates and is less expensive than sapphire. In addition, using two separate substrates rather than a single thicker substrate is advantageous, as it may be simpler to grow piezoresistors on two separate substrates, which can then be bonded to one core for use in sensor element 30, rather than growing piezoresistors on opposite sides of a single substrate.

In one embodiment, the coefficient of thermal expansion of the substrate is greater than 4 ppm/k, more preferably is greater than 4.5 ppm/k, more preferably is greater than 5 ppm/k, more preferably is greater than 5.5 ppm/k, more preferably is greater than 6 ppm/k, more preferably is greater than 6.5 ppm/k, and more preferably is greater than 7 ppm/k.

Core 66 need not be made from alumina, and substrates 68 need not be made from sapphire; other suitable materials may also be used, as the invention is not limited in this regard. Similarly, the invention is not limited to using a core and two substrates. Sensor element 30 may be made from one solid block of material (e.g., sapphire) onto which piezoresistors or other appropriate electrical components (e.g., strain-sensitive semiconductor materials) are grown or otherwise deposited. The Wheatstone bridge configuration enables the sensor element 30 to sense temperature as well as axial pressure with the same resistive circuit. The overall resistance of the Wheatstone bridge increases with temperature. Thus, for a particular current, the voltage across the bridge will increase with temperature, providing a convenient means for measuring temperature. When the bridge is subject to a compressive loading, it exhibits different resistance fluctuation characteristics, enabling pressure to be measured using the same circuit.

Once the transducer 2 is constructed, a package of electronics (not shown in the drawings) may be provided to process the output signals from the transducer 2. The transducer 2 may be run through several pressure and temperature cycles for calibration.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A pressure transducer package for measuring the pressure in an environment, the pressure transducer package comprising:
    a housing;
    a diaphragm supported by the housing;
    a support disposed in the housing; and
    a sensing element disposed in the housing between the diaphragm and the support so that the pressure from the environment acts on the diaphragm to compress the sensing element, the sensing element comprising;
    at least one substrate; and
    at least one piezoresistor formed on the at least one substrate;
    wherein the at least one substrate is formed of a material having a coefficient of thermal expansion greater than 4 ppm/k at 600 degrees kelvin.

2. The pressure transducer package of claim 1, wherein the substrate material has a coefficient of thermal expansion greater than 4.5 ppm/k at 600 degrees kelvin.

3. The pressure transducer package of claim 1, wherein the substrate material has a coefficient of thermal expansion greater than 5 ppm/k at 600 degrees kelvin.

4. The pressure transducer package of claim 1, wherein the substrate material has a coefficient of thermal expansion greater than 5.5 ppm/k at 600 degrees kelvin.

5. The pressure transducer package of claim 1, wherein the substrate material has a coefficient of thermal expansion greater than 6 ppm/k at 600 degrees kelvin.

6. The pressure transducer package of claim 1, wherein the substrate material has a coefficient of thermal expansion greater than 6.5 ppm/k at 600 degrees kelvin.

7. The pressure transducer package of claim 1, wherein the substrate material has a coefficient of thermal expansion greater than 7 ppm/k at 600 degrees kelvin.

8. The pressure transducer package of claim 1, wherein the substrate material is sapphire.

9. The pressure transducer package of claim 1, wherein the at least one substrate comprises first and second substrates, and wherein the first and second substrates each is supported by a filler disposed between the first and second substrates.

10. The pressure transducer package of claim 9, wherein the filler is formed of a material that is less expensive than the substrate material.

11. The pressure transducer package of claim 9, wherein the substrate material is sapphire for each of the first and second substrates, and wherein the filler is alumina.

12. The pressure transducer package of claim 1, wherein the support is separate from and not integral with the housing.

13. The pressure transducer package of claim 1, wherein the support is integral with the housing.

14. The pressure transducer package of claim 1, further comprising a compensator disposed between the diaphragm and the sensing element.

15. The pressure transducer package of claim 14, wherein the compensator is formed of a material having a coefficient of thermal expansion greater than that of the substrate.

16. The pressure transducer package of claim 14, wherein the compensator is formed of a material having a coefficient of thermal expansion greater than that of the housing.

* * * * *